Oct. 9, 1956 M. G. HANDSCHIN 2,766,323
METHOD AND APPARATUS FOR THE ARBITRARY REPETITION OF PARTS OF AUTOMATIC TELEPHONOGRAPH MESSAGES WHICH WERE NOT UNDERSTOOD
Filed Dec. 27, 1951
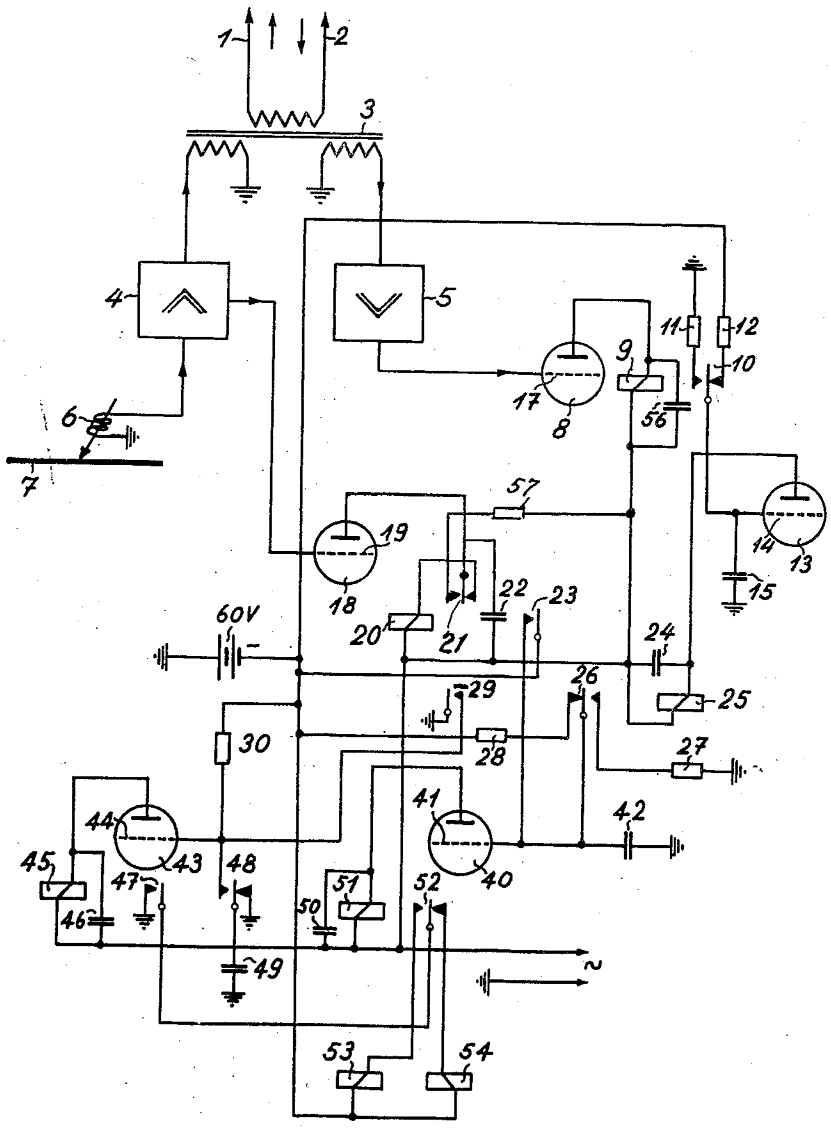
INVENTOR:
Max G. Handschin
By Bryant & Lowry
Attys.

2,766,323
Patented Oct. 9, 1956

2,766,323

METHOD AND APPARATUS FOR THE ARBITRARY REPETITION OF PARTS OF AUTOMATIC TELEPHONOGRAPH MESSAGES WHICH WERE NOT UNDERSTOOD

Max G. Handschin, Kusnacht, near Zurich, Switzerland, assignor to Promundo, Schaan, Liechtenstein, a firm Application December 27, 1951, Serial No. 263,547
10 Claims. (Cl. 179—6)

In the case of the telephonographs which have already become known, a message which was not understood could be repeated by speaking into the telephonograph over the telephone wire certain vowels designated for this purpose. In this manner the reproduction of parts of messages which were not understood can be repeated arbitrarily and as often as one likes. It has now become apparent, however, that the connections which so far have become known for these arbitrary repeats of reproductions are not sufficiently reliable. E. g. if there are on the carrier signals of a frequency which pass through the filter in front of the repeater equipment, the repeater begins to function automatically and the carrier cannot get into its final position. It has already been tried to get over this disadvantage by special methods of connection, e. g. by providing a bridge connection with dampers or balancing apparatus. However, this solution has the disadvantage that it implies accurate tuning of the telephonograph with respect to the telephone line, which cannot be carried out in practice, because the data of the telephone line change with each new connection, whilst those of the telephonograph remain constant. It is a further disadvantage of this solution that it is no longer effective if the line is prematurely disconnected during a reproduction as this disturbs immediately the symmetry of the bridging connection, so that at once an unintentional repetition takes place. The use of a single vowel to effect a repetition is not very convenient as, in the case of several languages and when the caller has a cold, a faultless functioning of the repeater device is doubtful.

The present invention avoids all these disadvantages by a particularly simple method. It is the main characteristic of this method that the caller, in order to induce an arbitrary repetition, speaks into the telephonograph over the telephone line a word of at least two syllables.

The equipment to carry out the method described in this invention is characterised by the provision of a testing device which comprises several electronic valves, relays, condensers, and resistors, which check the duration of the words spoken into the apparatus over the telephone line and at a signal duration to which the apparatus has been set induces a repetition, but speech impulses from the carrier side which also reach the set signal duration do not affect the device.

The attached drawing shows an example of how a testing device in accordance with the present invention could be arranged. Of the telephonograph of which this arrangement forms a part, only those parts are shown which are necessary to make the invention clear.

In the drawing 1 and 2 are two lines, which connect a repeating coil of the telephonograph with a telephone exchange. The testing device is shown in the position which occurs when the caller has already over the exchange induced a repetition and listens to the reproduction. This happens in a circuit composed of carrier 7, sound head 6, reproduction amplifier 4, repeater coil 3 and telephone exchange over the lines 1, 2. The speech impulses transformed by the repeater coil 3 travel at the same time to an adjustable amplifier 5 which has connected to it at its output end a valve 8 with control grid 17. Consequently, the speech impulses will excite a relay 9 in the anode circuit of valve 8. Relay 9 functions with as little inertia as possible. It does also not react to certain consonants, which are not effectively transmitted by modern telephone lines, i. e. relay 9 will flicker continually during the transmission of the speech impulse. This continually connects the control grid 14 of a valve 13 across a change-over switch 10 of relay 9 and a resistance 12 to the negative terminal of a 60 v. battery and earths the control grid 14 over a resistance 11. In the anode circuit of valve 13 is a relay 25 which has an operating delay and a little release delay. This method of operation is in a well-known manner determined by connecting a condenser 15 in series with the resistances 11 or 12. When relay 9 releases, relay 12, too, will be without current as control grid 14 of valve 13 and condenser 15 over resistance 12 are then charged negatively. When relay 9 is excited, the change-over switch 10 changes over to resistance 11 and condenser 15 begins to discharge through resistance 11, while control grid 14 becomes more and more positive. As soon as the anode current, which now sets in, has reached a certain value, relay 25 operates. Consequently, by modifying the resistance of resistor 11, the operating delay of relay 25 can be adjusted within wide limits. For instance, let the proportions be such that relay 25 has an operating delay of about 300 ms. Similarly, the release delay of relay 25 is set by resistance 11. Let this release delay amount to about 100 ms. as an example. Measurements have shown that words, numbers etc. of one syllable have a duration of between 400 and 600 ms., those of two syllables a duration of between 900 and 1200 ms., and polysyllables, as e. g. the word "replicate" of between 1300 and 1600 ms. It was also found that between two words there is a duration of at least 150 to 200 ms. Accordingly, relays 9 and 25 will release after every word, whereupon relay 25 operates a contactor 29 and earths the control grid 44 of a valve 43. This excites a relay 45 in the anode circuit of valve 43, this relay keeps itself above its change-over switch 48 because a condenser 49 which was previously discharged, is connected to the control grid 44. Relay 45 remains excited until condenser 49 is charged sufficiently over a resistance 30 from a minus 60 v. supply. But as relay 25 is excited once at each spoken word, and closes its contact 29, condenser 49 will discharge every time. Thus relay 45 releases with delay when there is no current in relay 25. As an example, let us assume this delay to be 7 seconds. With relay 45 excited, its contact 47 is closed and a coupling magnet 54 for the drive of sound carrier 7 is excited over change-over switch 52 of relay 51. This movement of sound carrier 7 occurs in a telephonograph when the caller receives a reproduction over the telephone line. If now the caller did not understand a part of the message properly, he could e. g. speak the polysyllable "replicate" into his microphone. Consequently, speech impulses corresponding to the word "replicate" will arrive from the exchange over the repeater coil 3, the adjustable amplifier 5 and the electronic valve 8, parallel with impulses due to the sound carrier 7 (or its sound head 6) and which excite relay 9. As the caller speaks a comparatively long word, relay 51 is now excited. The latter is in the anode circuit of an electronic valve 40, the control grid 41 of which is in zero position supplied from a minus 60 v. source over change-over switch 26 of relay 25 and over a resistance 28. This causes a condenser 42 connected to the control grid 41 to be charged negatively. As soon as relay 25 actuates its change-over switch 26, condenser 42 begins to discharge through a resistance 27 which modifies the voltage at control grid 41 to become more positive and produces an anode current in valve 40. As soon as the operating current strength of relay 51 is reached, this begins to operate, i. e. relay 51 has an operating delay which is adjustable within wide limits by means of the resistance 27. This is now determined so as to be slightly less than the duration of time which the caller requires to pronounce the word which initiates the repetition, e. g. the word "replicate." The pronunciation of this word excites also relay 51. It changes over its contact 52, which excites a coupling magnet 53 for the reverse drive of sound carrier 7, while at the same time coupling magnet 54 is switched off. This state lasts for the time required to release relay 25, plus the release delay of relay 51. The release delay of relay 51 is adjustable by means of a resistance 28, and may amount to, say, 200 ms. in an example. When relay 51 is released, coupling magnet 53 for the backward motion becomes without current and coupling magnet 54 for the forward drive is again excited.

It is, of course, quite possible that there are recorded on the sound carrier 7 similarly long words as that one that was chosen to initiate the process of repetition. Each of these words would cause an unwanted repetition to take place. To avoid this, relay 51 receives a special signal. The speech impulses originating from the sound carrier 7 are taken to the control grid 19 of another electronic valve 18 which has in its anode circuit a relay 20. In parallel with the winding of this relay is a comparatively large condenser 22, which gives the relay a comparatively large operating delay of, say, 1200 to 1400 ms. Relay 20 is excited every time when a long speech impulse is emitted from the sound carrier side. But the excitation lasts only for a short while, because the anode circuit of electronic valve 18 is interrupted at once every time by contact 21 of relay 20. Condenser 22 is discharged immediately through a resistance 57, so that the operating delay remains always the same. The momentary operation of relay 20 is sufficient to emit over its contact 23 a negative impulse to the control grid 41 of electronic valve 40, so that condenser 42, connected to control grid 41, is again fully charged negatively. This avoids the operation of relay 51 and the initiation of an unwanted repetition.

There remains to be mentioned that all speech impulses which are shorter than that of the signal word chosen for the repetition cannot actuate relay 20, not even if these impulses are emitted in rapid succession, as condenser 22 is always discharged immediately through the winding of relay 20.

When the records on sound carrier 7 are exhausted, relays 9 and 25 are no longer excited, so that after about 7 seconds relay 45 becomes currentless. Consequently, coupling magnet 54 for the forward drive of sound carrier 7 becomes dead and sound carrier 7 stops.

All relays of the checking device described above are A. C. operated, so that a rectifier is not required. Also all relays are preferably made like D. C. relays, as these are sold cheaper than A. C. relays. To adapt them for A. C. operation, condensers 24, 46, 50 and 56 are connected in parallel with the relay-windings.

The principal advantage of the device described above consists in the fact that a filter is not required. It has become clear that such filters are not suitable for faultless distinction between those speech impulses due to the caller, which come over the telephone line, and those originated by the sound carrier. This makes it difficult to avoid unwanted initiations of repetition. The described arrangement is, however, very reliable in operation. By simple adjustment of the different relays delays the device may be set without difficulty for signal words of two, three, or more syllables.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a telephonograph including means for recording messages received over a telephone line, and means for reproducing, into such a line, messages which have previously been recorded by said recording means, the improvement which comprises a testing device responsive to the reception of a code signal of predetermined duration over said line for initiating operation of said reproducing means to repeat a second time a recorded message which has once been reproduced during a call, and means connected to said testing device and to said reproducing means, for joint control thereby, for inhibiting the initiation of a repeated reproduction by a similar code signal imposed on said line from said reproducing means.

2. A telephonograph in accordance with claim 1, including a repeating coil connected between said line and said reproducing means, a reproduction amplifier, and an adjustable amplifier, said repeating coil and said amplifiers being connected in parallel.

3. A telephonograph in accordance with claim 1, including a first quick acting relay connected to respond to all speech impulses, and a second relay having both an operate delay and a release delay, said second relay being connected for control by said first relay, whereby both of said relays release after each impulse corresponding to one word.

4. A telephonograph in accordance with claim 1, including a first quick acting relay connected to respond to all speech impulses, and a second relay having both an operate delay and a release delay, said second relay being connected for control by said first relay, whereby both of said relays release after each impulse corresponding to one word, a third relay controlled by said first and second relays, and having an operate delay adjusted so that it responds only to an impulse corresponding to a word of two syllables, and a magnet for controlling the direction of movement of said reproducing means, said magnet being connected for control by said third relay to initiate a repetition of the recording.

5. A telephonograph in accordance with claim 4, including a fourth relay controlled by said first two relays and having a long release delay, and means controlled by said fourth relay for initiating movement of said reproducing means in forward direction.

6. A telephonograph in accordance with claim 5, including a fifth relay having an operating delay and responding to words of at least two syllables, and means controlled by said fifth relay for preventing operation of said third relay.

7. A telephonograph in accordance with claim 6, in which said fifth relay has an operating delay smaller than that of said third relay.

8. A telephonograph in accordance with claim 7, in which said fifth relay includes a contact set operable to interrupt the operating circuit of said fifth relay at each actuation thereof.

9. A telephonograph in accordance with claim 8, including three electronic valves, said second, third and fourth relays being each connected in the anode circuit of a respective valve, and a resistance-capacitance combination for each valve having its midpoint connected to the grid of the respective valve for adjusting the operating and releasing times of the corresponding relays.

10. A telephonograph in accordance with claim 9, in which all of said relays are D. C. relays having their coils bridged by respective condensers.

References Cited in the file of this patent

UNITED STATES PATENTS

| | | |
|---|---|---|
| 2,171,366 | Hipple | Aug. 29, 1939 |
| 2,519,568 | Handschin | Aug. 22, 1950 |
| 2,537,406 | Handschin et al. | Jan. 9, 1951 |
| 2,537,407 | Handschin et al. | Jan. 9, 1951 |